2,865,969

CHEMICAL PROCESS FOR PREPARATION OF DI-ALKALI METAL DIMERS OF DIOLEFINS

Stuart Schott, Cincinnati, Ohio, assignor to National Distillers and Chemical Corporation, New York, N. Y., a corporation of Virginia No Drawing. Application May 9, 1956
Serial No. 583,613

10 Claims. (Cl. 260—665)

The present invention relates to an improved process for preparation of dialkali metal derivatives of dimers of conjugated diolefins and, more particularly, to a process for reacting a conjugated diolefin with a finely divided alkali metal under conditions to selectively produce in high yields dialkali metal derivatives of dimers of the conjugated diolefin and which derivatives can be further processed, such as by carbonation, to dialkali metal salts of aliphatic diacids having two more carbon atoms per molecule than the dimer of said diolefin. More particularly, the invention embodied herein relates to a process for reaction of butadiene with finely divided sodium under conditions to produce a mixture of disodiooctadienes which, upon carbonation of the mixture, followed by treatments including hydrogenation and acidification, yield $C_{10}$ saturated diacids including sebacic acid, 2-ethylsuberic acid and 2,5-diethyladipic acid.

In co-pending applications, such as S. N. 333,354, filed January 26, 1953 (now abandoned); S. N. 382,456, filed September 25, 1953 (now U. S. Patent No. 2,816,916) and S. N. 556,469, filed December 30, 1955 (now U. S. Patent No. 2,816,936), processes are disclosed whereby a conjugated diolefin is reacted with an alkali metal in finely divided form under conditions to produce, in selective manner and in high yields, dialkali metal derivatives of dimers of the diolefin. As is disclosed in such applications, the reaction is carried out in the presence of a suitable reaction medium and a small amount of a polycyclic aromatic hydrocarbon compound although, with use of the alkali metal in the form of particles of exceptionally low, rather well defined particle size characteristics, the reaction can be carried out in absence of the polycyclic aromatic hydrocarbon with obtainment in relatively high yields of the desired dialkali metal derivatives of the dimers of the diolefin which ultimately are convertible to diacids containing two more carbon atoms per molecule than the dimer of the diolefin.

With reference to the reaction medium utilized for carrying out the described reaction in which the dimetallo derivatives of the dimers of the conjugated diene are formed, the reaction medium consists essentially of an ether of a particular class of ethers that appear to possess the common property of serving as promoters of the selective dimerization reaction involved. The ether can be an aliphatic monoether having a methoxy group, in which the ratio of the number of oxygen atoms to the number of carbon atoms is not less than 1 : 4. Examples include dimethyl ether, methyl ethyl ether, methyl n-propyl ether, methyl isopropyl ether, and mixtures of such methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ether, diethyl, and methyl butyl ethers. The simple methyl monoethers, as dimethyl ether, and the dimethyl and diethyl ethers of ethylene glycol are preferred. The ethers employed should not contain any groups such as hydroxyl, carboxyl and the like which are distinctly reactive towards an alkali metal such as sodium. Although the ether may react in some reversible manner, it must not be subject to extensive cleavage as cleavage action destroys the ether, uses up sodium, and introduces into the reacting system, alkali metal alkoxides which, in turn, tend to induce rubber-forming reactions (polymerization) rather than the desired dimerization reaction. Although the reaction medium should consist essentially of the specific ethers, other inert media can be present in limited amounts. In general, these inert media will be introduced with the alkali metal as the liquid in which the alkali metal is suspended and will act chiefly as diluents. The concentration of ether in the reaction mixture should at all times be maintained at a sufficient level to have a substantial promoting effect upon the desired dimerization reaction.

In such a process, when use is made of a supplementary activating material, a relatively small amount of at least one material from the class of polycyclic aromatic compounds is employed. By this term it is intended to include both condensed ring hydrocarbons such as naphthalene and phenanthrene, as well as the uncondensed polycyclic compounds such as diphenyl, the terphenyls, dinaphthyl, tetraphenyl ethylene, and the like. The polyphenyl compounds such as diphenyl and the terphenyls and their mixtures have been found to be particularly useful. The amount of the polycyclic hydrocarbon to be used will vary over a range which in every case will be relatively small in comparison with the amount of diolefin undergoing reaction. Concentrations in the range of 1 to 10 weight percent based on the amount of the diolefin are ordinarily quite sufficient.

In such a process, the reaction temperature is preferably held below 0° C. with a more preferred temperature range being between —20 to —50° C. Generally speaking, all ethers begin to yield cleavage products at temperatures of about 0° C. and above with the result that sufficient alkoxides are formed to yield high molecular weight polymeric acids rather than the desired low molecular weight dimers.

In studies carried out with processes as aforedescribed, it has been found that the yield of dialkali metal derivatives of dimers of the conjugated diolefins generally increases as the temperature at which the reaction is carried out is lowered. As the described metalation reaction is exothermic, it is highly preferable that the heat of reaction be removed so as to maintain the reacting mixture at the desirably low temperatures for obtainment of high yields of the desired metalation reaction product. One method for effecting such heat removal is the use, in the reaction vessel, of cooling coils but, due to the nature of the reaction mixture, use of cooling coils is not satisfactory as the alkali metal (e. g., sodium) reactant and the reaction product (e. g., disodiooctadienes) tend to deposit on the surface of the cooling coils thereby rendering them ineffective unless the operation, especially when run continuously, is subjected to frequent shutdowns for cleaning the cooling coils. Additionally, the use of cooling coils is undesirable as a hazard is presented when and if failures occur whereby cooling mediums (e. g., water) that may be used leak into the reaction mixture containing highly reactive materials such as sodium, sodium adducts of the conjugated diolefins, etc.

It has now been discovered that a process as aforedescribed can be carried out in improved manner with effective removal of the heat of reaction, thereby enabling maintenance of the reaction mixture at desired low temperatures by use in the reaction mixture of a suitable low boiling hydrocarbon to lower the boiling point of the liquid phase of the reaction mixture and remove heat of reaction by reflux.

For such a purpose, the low boiling hydrocarbon should be a material that is inert with respect to the alkali metal and conjugated diolefin reactants and is lower boiling than the ether reaction medium. Particularly suitable for such usage are low boiling hydrocarbons such as ethane, propane, and mixtures thereof, in amounts that need not be more than the amount required to furnish sufficient reflux for removing the heat of reaction. Hence, by a method as embodied herein, wherein heat of reaction is removed by refluxing, the metalation reaction can be carried out and maintained at temperatures substantially below the boiling point of the ether medium. Thus, for example, in the use of dimethyl ether as the reaction medium and propane as the low boiling hydrocarbon, the process can be carried out without limitation to the boiling point of the dimethyl ether (B. P., —23° C.) for removal of heat of reaction without deleterious effect on the reaction or subsequent isolation of products thereof due to the presence of the low boiling hydrocarbon in amounts that furnish sufficient reflux for the heat removal.

In one typical method for carrying out the process embodied herein, the alkali metal (e. g., sodium) dispersion is initially prepared by placing an inert hydrocarbon such as isooctane in a suitable vessel with the appropriate amount of sodium. The mixture is heated in a surrounding bath or otherwise until the sodium has melted (M. P. 97.5° C.). Then a suitable high speed agitator is started and, preferably, an emulsifier consisting, for example, of the dimer of linoleic acid in the amount of ½% (based on sodium) may be added. After a short period of agitation, a test sample of the dispersion shows the particle size to be in the 5–15 micron range. The stirring is stopped and the dispersion is allowed to cool to room temperature. Inert liquids such as dibutyl ether, n-octane, n-heptane, straight run kerosene, and other materials, may be used as suspension media for the dispersion. Other well-known substances may be used instead of the dimeric linoleic acid as the dispersing agents.

The metalation reaction can then be carried out in continuous manner by separate, simultaneous feeding of the alkali metal dispersion, the ether reaction medium, and the diolefin into a suitable reaction vessel provided with refluxing means and a product outlet port, the diolefin being preferably added slowly and at the same rate at which it reacts with the alkali metal. During the reaction, the vessel contents are maintained under agitation (e. g., stirring) and, in accordance with an embodiment of this invention, a low boiling hydrocarbon such as propane is added to the reaction vessel, preferably with the ether reaction medium which is precooled to a temperature below the boiling point of the solution. In continuous operation, the amount of ether-propane continuously introduced into the reaction vessel is controlled to an amount substantially the same as that continuously withdrawn from the vessel in a slurry or solution of the reaction product, i. e., the dimetallo derivatives of the diolefin dimer. As the reaction is exothermic and the temperature of the reacting mixture would tend to rise in the absence of provisions for removal of the heat of reaction, the use of propane in the mixture results in vaporization of a propane-ether phase which is refluxed to remove reaction heat.

In order to further describe the invention, reference is made to the following examples utilized for illustrative and not limitative purposes. In the examples, the product of the metalation reaction was, in each case, carbonated by pouring it onto an excess of solid $CO_2$. After allowing excess $CO_2$, dimethyl ether and alkylate to evaporate, the remaining solid was acidified with HCl and the acidified product distilled. The distillate obtained was, in each case, analyzed for content of $C_{10}$ aliphatic diacids; the yield thereof being based on the amount of butadiene reacted.

EXAMPLE 1

Preparation of $C_{10}$ dibasic acids in dimethyl ether solution

The reaction was carried out in a stirred reactor having a gas inlet tube extending into the body of the reaction mixture and a reflux condenser leading to a nitrogen atmosphere. The system was purged with nitrogen and charged with 1950 parts dimethyl ether, 150 parts of dry sodium chloride, 23 parts of sodium dispersed in 60 parts of alkylate and 6 parts of mixed ortho, meta and para terphenyls. The average particle size of the sodium in the dispersion was 12 microns. A stream of gaseous butadiene amounting to a total of 162 parts was passed into the reactor over an 85 minute period while maintaining vigorous agitation and a reaction temperature of about —30° C. During this period two additional increments of sodium equivalent to the first increment were added to the reaction.

After the butadiene addition was complete, the reaction mixture containing the disodio derivative as a slurry was carbonated by pouring it upon an excess of solid carbon dioxide. After evaporation of excess carbon dioxide and dimethyl ether there was obtained a solid product consisting essentially of the sodium salts of the $C_{10}$ unsaturated dicarboxylic acids. A smaller amount (less than 5%) of butadiene polymer also was isolated. The alkaline solution of the dicarboxylic acids was hydrogenated using a nickel catalyst and the resulting hydrogenated diacids were precipitated by addition of mineral acid. The combined yield of 10-carbon dibasic acids was 81% based on the sodium charged. There was also obtained a 0.4% yield of lower boiling acids and 5.2% of higher polymeric acids. The neutral equivalent of the C–10 acids was 101.3.

EXAMPLE 2

Preparation of $C_{10}$ dibasic acids in dimethyl ether-propane solution

A reaction was carried out in a stirred reactor as in Example 1. In this case, the reactor was charged with 1300 grams of dimethyl ether, 650 parts of propane, 150 parts of dry sodium chloride, 6 parts of mixed ortho, para and meta terphenyls, and 23 parts of sodium dispersed in 60 parts of alkylate. The average particle size of the sodium in the dispersion was 12 microns. As in Example 1, a stream of gaseous butadiene amounting to a total of 162 parts was passed into the reactor over a two-hour period while maintaining vigorous agitation and a reaction temperature of about —30° C. In this case, cooling was realized by allowing the propane-dimethyl ether mixture to reflux during the progress of the reaction. Two additional increments of sodium equivalent to the initial charge were added during the course of the reaction.

The disodiooctadiene derivative was carbonated and the product worked up as in Example 1. Analysis of the product showed 2.0% low boiling acids, 83.2% $C_{10}$ dibasic acids and 3.1% high molecular weight acids; neutral equivalent of the $C_{10}$ fraction was 100.9.

For carrying out the process embodied herein, suitable examples of the alkali metal include sodium, potassium and lithium with sodium being preferred as it provides for excellent selectivity and yields of desired dimerized products and is cheaper and more readily available. Use of chemically pure sodium is not essential, however, as mixtures containing a substantial amount of sodium are useful as are alloys of sodium and potassium, of sodium and calcium, and of sodium and lithium.

One factor essential to the successful production of the dimerized derivative is the use of the alkali metal in the dispersed form. A sodium dispersion in which the average particle size is less than 50 microns is necessary for satisfactory dimerization since bulk sodium instead of dispersed sodium either yields no product or results largely in the formation of highly condensed diene polymers. The formation of these polymers as a major reaction product can be substantially avoided by employing the sodium or potassium as a fine dispersion which can be conveniently made in an inert hydrocarbon or ether as a separate step preliminary to the reaction of the diene.

The diolefins which are useful for this improved process include any aliphatic conjugated diolefin including, for example, butadiene, isoprene, dimethyl butadiene, the pentadienes, as the methyl-1,3-pentadienes, and the like. In general, it is desirable to use the aliphatic conjugated diolefins having from 4 to 8, inclusive, carbon atoms.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparation of dialkali metal derivatives of dimers of conjugated aliphatic diolefins which comprises reacting a conjugated aliphatic diolefin with a finely divided alkali metal at temperatures below 0° C. in a reaction medium comprising an ether and an inert saturated aliphatic hydrocarbon lower boiling than said ether to prepare a mixture of dialkali metal derivatives of dimers of said diolefin, said reaction being carried out with refluxing of reaction medium containing said inert hydrocarbon to remove heat of reaction from the mixture in which the alkali metal is undergoing reaction with the diolefin, said ether being a member from the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof.

2. A process, as defined in claim 1, wherein the conjugated diolefin is butadiene.

3. A process, as defined in claim 1, wherein the reaction is carried out in presence of a small amount, based on the weight of the diolefin, of a polycyclic aromatic hydrocarbon.

4. A process, as defined in claim 1, wherein the saturated aliphatic hydrocarbon is propane.

5. A process, as defined in claim 1, wherein the alkali metal is sodium.

6. A process, as defined in claim 1, wherein the alkali metal is in the form of a dispersion in a liquid dispersing medium of alkali metal particles averaging less than about fifty microns in size.

7. A process, as defined in claim 1, wherein the alkali metal is sodium in the form of a dispersion in a liquid dispersion medium of sodium particles of less than about fifty microns in size, the reaction is carried out at a temperature below about 0° C., and the saturated hydrocarbon is propane.

8. A process, as defined in claim 7, wherein the reaction is carried out in presence of a small amount, based on the weight of the diolefin, of a polycyclic aromatic hydrocarbon.

9. A process for preparation of a mixture of disodiooctadienes which comprises reacting butadiene with finely divided sodium at a temperature below the boiling point of dimethyl ether and above the boiling point of propane, said sodium being in the form of particles averaging less than about 50 microns in size, in a reaction medium comprising dimethyl ether and propane to prepare a mixture of disodiooctadienes, said reaction being carried out with refluxing of reaction medium to remove heat of the propane-containing reaction from the mixture in which the finely divided sodium is undergoing reaction with butadiene.

10. A process, as defined in claim 9, wherein the reaction is carried out in presence of a small amount of a polycyclic aromatic hydrocarbon.

References Cited in the file of this patent

UNITED STATES PATENTS

| | | |
|---|---|---|
| 2,086,810 | Langwell et al. | July 13, 1937 |
| 2,171,867 | Scott et al. | Sept. 5, 1939 |
| 2,352,461 | Walker | June 27, 1944 |
| 2,518,474 | Hudson | Aug. 15, 1950 |
| 2,773,092 | Carley et al. | Dec. 4, 1956 |

OTHER REFERENCES

Hansley: Ind. and Eng. Chem., vol. 143, No. 8, pages 1759–66. Pages 1759–1763 relied on.